US005211964A

United States Patent [19]

Prytherch et al.

[11] Patent Number: 5,211,964

[45] Date of Patent: May 18, 1993

[54] PRESS MACHINE WITH MEANS TO ADJUST PUNCHING FORCE

[75] Inventors: Edmund Prytherch, Columbia; Edward M. Quarterman, Gilbert, both of S.C.

[73] Assignee: Westinghouse Electric Corp., Pittsburgh, Pa.

[21] Appl. No.: 703,313

[22] Filed: May 20, 1991

[51] Int. Cl.$^5$ ............ B29C 43/08

[52] U.S. Cl. ............ 425/140; 425/149; 425/150; 425/171; 425/345

[58] Field of Search ............ 425/140, 149, 345, 352, 425/171, 172, 150

[56] References Cited

U.S. PATENT DOCUMENTS

| | | | |
|---|---|---|---|
| 3,063,390 | 11/1962 | Frank | 425/140 |
| 3,276,079 | 10/1966 | Cohn | 425/345 |
| 3,384,035 | 5/1968 | Gabriel et al. | 425/345 |
| 3,408,963 | 11/1968 | Alexander, Jr. et al. | 425/345 |
| 3,483,831 | 12/1969 | Fujii et al. | 425/345 |
| 3,559,244 | 2/1971 | Grether et al. | 425/345 |
| 3,910,737 | 10/1975 | Shimada et al. | 425/140 |
| 4,030,868 | 6/1977 | Williams | 425/149 |
| 4,057,381 | 11/1977 | Korsch | 425/345 |
| 4,104,014 | 8/1978 | Pearce | 425/345 |
| 4,184,827 | 1/1980 | von Herrmann et al. | 425/171 |
| 4,354,811 | 10/1982 | Marmo | 425/140 |
| 4,680,158 | 7/1987 | Hinzpeter et al. | 425/149 |
| 4,793,791 | 12/1988 | Kokuryo | 425/345 |
| 4,817,006 | 3/1989 | Lewis | 425/149 |
| 5,087,398 | 2/1992 | Le Molaire et al. | 425/150 |

FOREIGN PATENT DOCUMENTS

| | | | |
|---|---|---|---|
| 1196963 | 7/1965 | Fed. Rep. of Germany | 425/149 |

*Primary Examiner*—Jay H. Woo
*Assistant Examiner*—Robert B. Davis

[57] ABSTRACT

A press machine includes a plurality of press units. Each press unit has a die opening and cooperating upper and lower punches which are slidable into an extended, inward position in the die opening. Each press unit is successively advanced into a punching position where the upper and lower punches are positioned in the extended, forward position in the die opening for pressing material into a compact body. A compensator is positioned at the punching position for exerting a punching force onto upper and lower punches advanced into the punching position. When the punching force is applied, the displacement of the upper and lower punches is compared with a reference standard displacement indicative of the actual, undisplaced position of the punches just prior to the application of the punching force. The punch force is adjusted if necessary so as to obtain equal displacement of upper and lower punches and at the same time and maintain the correct density of the resulting compact, finished bodies.

12 Claims, 3 Drawing Sheets

PRESS MACHINE WITH MEANS TO ADJUST PUNCHING FORCE

FIELD OF THE INVENTION

This invention relates to a press machine for forming pellets from powder, and more particularly to a press machine having a plurality of press units where each press unit has a die opening and cooperating upper and lower punches which are slidable into an extended, inward position in the die opening for compressing powder into pellets.

BACKGROUND OF THE INVENTION

In the manufacture of nuclear fuel pellets, uranium dioxide powder typically is fed into a rotary press. The press consists of a plurality of press units rotatable about a vertical axis. Each press unit includes a die opening and a press table and cooperating upper and lower punches which are slidable into an extended, inward position in the die openings. Each press unit is advanced successively into a punching position where the upper and lower punches are positioned in the extended, inward position in the die opening for pressing material into a compact body. Force generating means, such as upper and lower pneumatic compensators engaging upper and lower rollers between which the punches pass, is positioned at the punching position for exerting a punching force onto upper and lower punches advanced into the punching position. The force generating means acts similar to a large adjustable spring exerting downward force onto the punches advanced into the punching position. When the punching force is exerted on punches advanced into the punching position, the punches are displaced outward. The greater the amount of force exerted against the punches, the less the displacement and the greater the powder compression. This punch displacement is compared with a theoretical "zero" displacement. Based upon this comparison, the amount of powder inserted into the die openings, and the amount of pressure applied at the punching position is varied to obtain a desired pellet length and density. Additionally the punch force is changed to assure an equal displacement of both top and bottom punches. Unequal punch displacement creates a pellet having a diameter varying along the length of the pellet.

It has been determined, however, that the comparing of the punching position displacement with the theoretical "zero" displacement does not always give an actual punch displacement. As a result, after the punching position pressure is adjusted in an attempt to obtain equal punch displacement, the upper and lower punches may appear to displace an equal amount. The inexactitude of punch displacement created by comparing the punching position displacement with the changing datum reference of the theoretical "zero" displacement could result in unequal upper and lower punch displacement even though punch displacement appears to be equal based upon the comparison.

As an example of one type of press machine which suffers the above problem, each press unit includes upper and lower punches having bearings positioned on punch heads which engage a cam surface. As the punch heads ride along the cam surface, the punches are successively advanced into a punching position where the upper and lower punches are positioned in the die opening for pressing material into a more compact body.

Each cam includes upper and lower inclined cam surfaces positioned adjacent the punching position for guiding respective upper and lower punches into the extended, forward position within the die openings A substantially flat cam surface extends from each of the inclined cam surfaces to the punching position for engaging and maintaining the punches in the extended, forward position as the punches approach the punching position. In this extended position, the punches are forced into the die opening and compact the powder to an almost finished pellet size and dimension. The final punching force exerted on the punches presses the powder into the desired dimension and density. The desired pellet length and density are controlled by the amount of powder entering the die and the force applied onto the punches at the punching position.

As the upper and lower punches enter the punching position, the punches pass between two rollers having a pneumatic compensator connected to each roller for exerting a punching force onto each punch. The pneumatic compensator acts similar to an adjustable spring for maintaining pressure on the two rollers. The rollers are positioned so that as the punches pass therebetween, the punches engage the roller periphery forcing the punches downward into a final, compressive position. Punch displacement can be a few millimeters; however, the generated forces resulting from the displacement are tremendous causing compression of the pellet into a final dimension and density.

During powder compression, the powder exerts an equal and opposite effect on the punches and rollers causing an outward displacement of the punches. By adjusting the pressure of the pneumatic compensator, the total force exerted on the rollers and punches is varied and, thus, the punch displacement can be changed. A greater pressure exerted on the rollers and punches creates less rearward displacement of the punches and rollers, and, as a result, the pellets are compressed a greater amount.

A displacement transducer is mounted on each roller and monitors displacement of the punches. The transducers emit a voltage signal corresponding to the displacement of the punches and rollers. At the point of maximum powder compression where the roller contacts the top center of the punch heads, a controller senses and records the transducer voltage output. The voltage output is compared with a reference datum voltage set at electrical "zero" which corresponds theoretically to a point where no punching force has been applied. The difference between the two voltages represents theoretically the punch displacement.

As noted before, this prior art system has drawbacks. The theoretical "zero" position of the transducer shifts because the transducers do not remain stationary. The vibration resulting from high speed rotary press operation, the variations in temperature, unaccurate mechanical machine tolerances and other factors causes the transducers to move slightly. Transducer movement variations in fractions of a millimeter can cause the transducer to shift. Thus, the resulting voltage output from the transducer in a "true" nonpunching position where the punches are positioned in the extended, forward position just prior to application of the punching force will sometimes be above or below the "zero" theoretical voltage. As a result, the transducer voltage output at the point of maximum punch displacement is rarely compared to the "true" zero position and the actual displacement of the punch is not measured accurately.

As a result of inaccurate punch displacement measurement, the finished pellets vary in length from each other because pellet length is a function of punch displacement. Additionally, unequal deflection results in production of irregularly shaped pellets. As noted before, the amount of punch displacement is controlled by adjusting the pressure of the compensator. However, because the actual punch displacement measurement is inaccurate when compared with the electrical "zero", the actual displacement of upper and lower punches sometimes is not equal and irregularities in pellet configuration occur.

SUMMARY OF THE INVENTION

The present invention provides a press machine which overcomes the deficiencies of the prior art and which includes means for comparing the displacement of the upper and lower punches when the punching force is applied with a reference standard displacement indicative of the actual, undisplaced position of the punches just prior to application of the punching force in the punching position.

In accordance with one embodiment of the present invention, the press machine includes a plurality of press units with each press unit having a die opening and cooperating upper and lower punches being slidable into an extended, inward position in the die opening. Each press unit advances successively into a punching position where the upper and lower punches are positioned in the extended, inward position in the die opening for pressing material into a compact body. Force generating means is positioned at the punching position for exerting a punching force onto upper and lower punches advanced into the punching position. Means compares the displacement of the upper and lower punches when the punching force is applied with the reference standard displacement indicative of the actual undisplaced position of the punches just prior to the application of the punching force.

First sensor means is positioned for sensing the undisplaced position of the punches prior to advancing into the punching position when the punches are in an extended, inward position. Second sensor means is positioned adjacent the punching position for sensing the position of the punches when advanced into the punching position. Means is connected to the comparing means and sensing means for measuring displacement of the punches in the sensed positions. The force generating means for exerting a punching force onto upper and lower punches advanced into the punching position includes spaced-apart upper and lower rollers positioned at the punching position for engaging respective upper and lower punches advanced into the punching position. A pneumatic compensator is connected to each roller for directing an inward force onto respective rollers and punches. Upper and lower transducers are operatively connected to the comparing means and the rollers. The transducers are responsive to deflection of the punches for emitting signals to the comparing means representative of the punch displacement.

In one embodiment, guide cam means acts on the upper and lower punches for directing successive upper and lower punches into the die openings. The guide cam means includes upper and lower inclined cam surfaces positioned adjacent the punching position for guiding respective upper and lower punches into the extended inward position within the die opening. A substantially flat cam surface extends from each of the inclined cam surfaces to the punching position for engaging and maintaining successive sets of upper and lower punches in an extended, inward position as the punches approach the punching position.

A method of maintaining uniform pellet density and length for pellets produced on the press machine also is disclosed. In one advantageous embodiment, the pellet density of a sample pellet produced on the press machine is calculated by weighing a sample pellet and measuring the sample pellet length for calculating the pellet density. The pellet density is compared with a predetermined standard which comprises a range of pellet densities. If the pellet density is above or below the predetermined standard, the force to be exerted on one or both punches advanced into the punching position is adjusted.

BRIEF DESCRIPTION OF THE DRAWINGS

Some of the objects and advantages of the present invention having been stated, others will be fully understood by reference to the following drawings in which.

DETAILED DESCRIPTION

Figure 1:
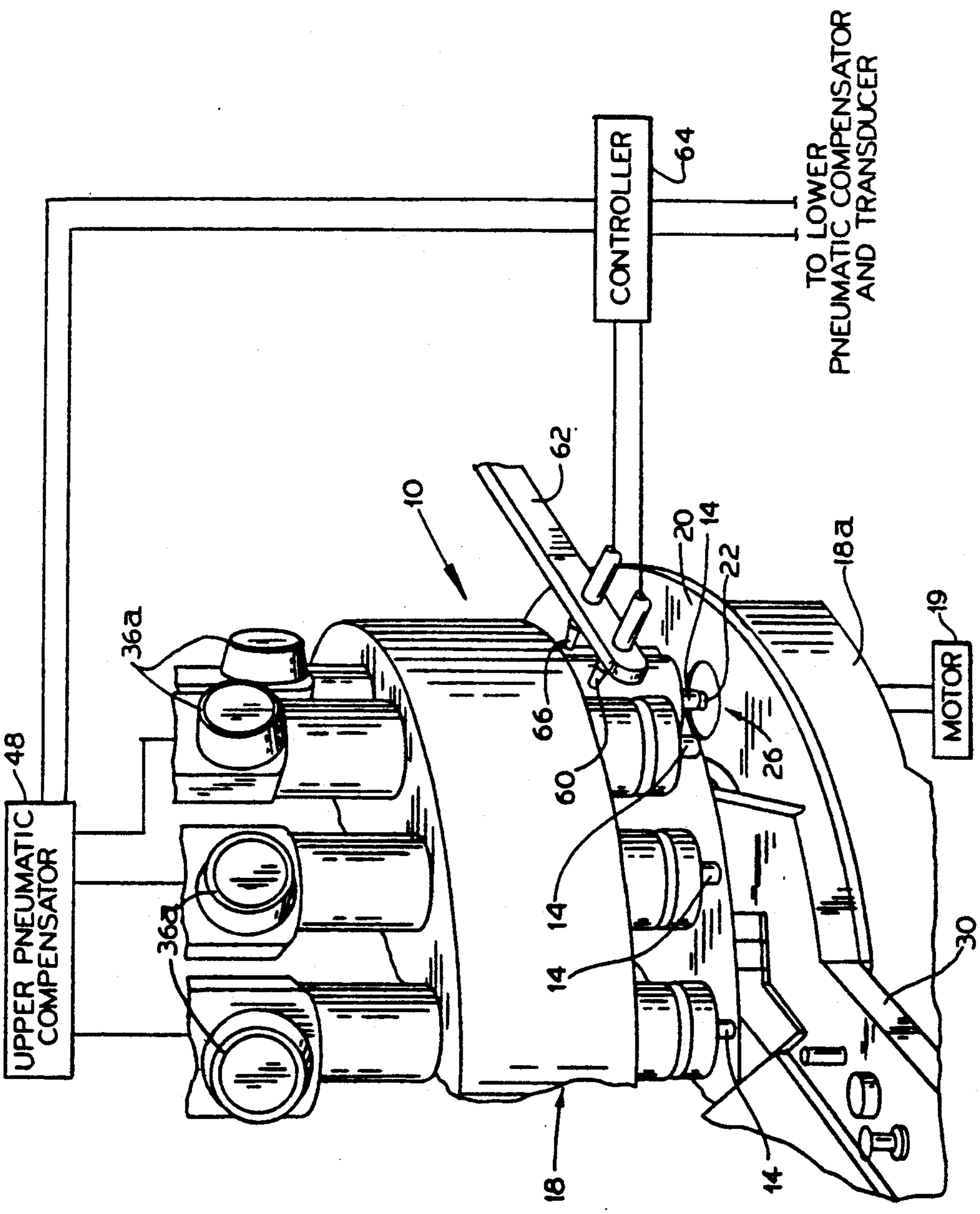
FIG. 1 is a partial isometric view of the top portion of an embodiment of the rotary press machine in accordance with the present invention and showing the positioning of first and second sensors relative to the press units.

Referring now to the drawings, and more particularly to FIG. 1, there is illustrated a press machine 10 in accordance with one embodiment of the present invention. The press machine is a rotary press having sixteen press units indicated generally at 12 (FIGS. 1 and 2) for pressing uranium dioxide powder into a final pellet form. Although sixteen press units 12 are illustrated, it is understood that a press can have a different number of press units depending on the desired size and capacity of the press. The rotary press also can be used with other powder or ceramic materials. Similar rotary press machines include a machine manufactured by Ed Courtoy of Belgium, model number R53.

Each press unit 12 includes respective upper and lower punches 14, 16 with an enlarged cylindrical portion slidably mounted in respective upper and lower portions of a punch housing indicated generally at 18. The punch housing 18 is rotatable about a central, vertical axis defined by a central frame hub (not shown) of the press machine 10. The housing 18 is rotatably supported on the frame hub as is conventional with many types of rotary press machines. Conventional drive means, such as a motor and transmission gear system, indicated generally at block 19 in FIG. 1, rotate the punch housing 18 about the central, vertical axis of the frame hub.

A lower punch housing portion 18*a* supports a die table 20 having sixteen die openings 22 corresponding to the sixteen respective press units 12. The die openings 22 form orifices 24 extending into the die table 20. Both upper and lower punches 14, 16 are slidable into an extended, inward position in the die opening 22 as the punch housing 18 rotates together with the die table 20.

Figure 2:
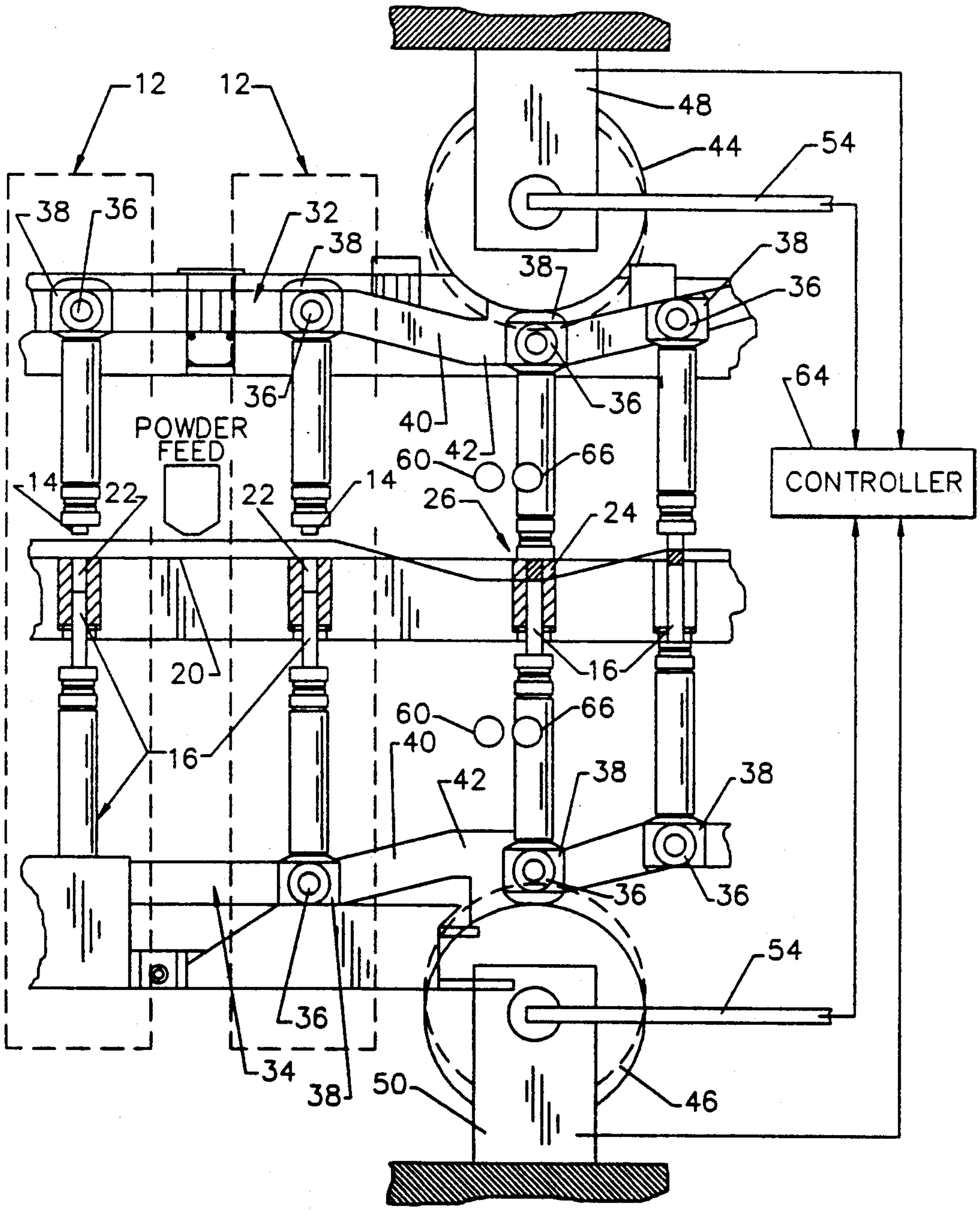
FIG. 2 is a schematic, elevational view showing movement of the punches relative to the pressure rolls and the pneumatic compensators and showing displacement of the rollers and punches.

As shown in FIG. 2, the lower punches 16 remain in the die openings 22 throughout rotary movement of the punch housing 18 and die table 20. The upper punches 14 move in and out of the die openings 22 and into an extended, inward position where the powder is compacted into a generally finished dimension. Final dimensioning and density formation of a pellet occurs at a punching position, indicated generally at 26, (FIGS. 1 and 2) where the punches 14, 16 are forced by a punching force for compressing the powder. Punch displacement can be as little as a few millimeters during the final compressive punching of the powder.

As illustrated in FIGS. 1 and 2, a powder feed mechanism 30 forces the powder onto the die table 20. As is conventional the powder feed mechanism inserts the powder into a die opening 22 when the upper punch 14 is retracted outward from the die opening and the lower punch 16 is retracted downward in the orifice forming the die opening. A weight cam (not shown in detail) is supported in the lower punch housing portion 18*a*. The weight cam regulates the amount of powder inserted into the die opening 22. By varying the amount of powder allowed to enter the die opening 22, the density and pellet length generally can be regulated. For example, when an excess amount of powder is inserted into the die opening 22 the compressive punch forces must be increased to obtain the desired pellet length. However, the compressed excess powder results in a pellet having a greater density than desired. Conversely, if excess powder is inserted into a die opening 22, and the compressive forces remain the same, then the powder is not compressed as much and the length of the pellet is greater than desired.

The punches 14, 16 are guided into the die openings 22 by means of fixed upper and lower cams, indicated generally at 32 and 34, which engage roller bearings 36 positioned on each punch top surface 38 (FIG. 2). The bearings 36 are positioned in bearing housings (indicated schematically at 36*a* in FIG. 1). Although the schematic isometric of FIG. 1 does not indicate the cams and other, more detailed features of FIG. 2, the drawing illustrates for explanation purposes the location and functional relationship between the punches 14, punch housing 18, and the die table 20. As the punch housing 18 and punches 12, 14 rotate around the frame hub, the bearings 36 engage the cams 32, 34 and the punches 14, 16 are guided into the die openings 22 into the extended, inward position and then into the punching position. Each upper and lower cam 32, 34 includes an inclined cam surface 40 positioned adjacent the punching position 26 for directing successive upper and lower punches 14, 16 into the die openings 22, and into the extended, inward position within the die openings 22. A substantially flat cam surface 42 extends from each of the inclined cam surfaces 40 to the punching position 26 for engaging and maintaining the punches 14, 16, in the extended, inward position as the punches approach the punching position. As the punches 14, 16 move on the inclined cam surface 40, the powder is compressed into a compact body. However, at this time the powder has not been punched into a final pellet form of desired length and density.

Force generating means, in the form of upper and lower rollers 44, 46 and upper and lower pneumatic compensators 48, 50, (FIG. 2) exerts a punching force onto upper and lower punches 14, 16 advanced into the punching position between the rollers 44, 46. For explanation purposes, the upper pneumatic compensator is illustrated at block 48 in FIG. 1 and operatively connected to the punches. Each of the upper and lower rollers is secured to the pneumatic compensator 48, 50 which acts similar to a large, biased spring exerting an inward force against the rollers. The rollers 44, 46 are positioned at the punching position so that as the punches pass therebetween, the punches engage the periphery of the roll so that the punches are displaced downward into a final, compressive position. Displacement of the punches 14, 16 can be a few millimeters; however, the generated forces resulting from the punch displacement are tremendous causing compression of the pellet into a final dimension and density.

The pneumatic compensators 48, 50 are mounted to the rotary press frame hub and include roller support members mounted at the axis of respective rollers 44, 46. The pneumatic pressure exerted by the pneumatic compensators acts upon the support members for maintaining the support members and rollers attached thereto in a biased condition inward toward the die opening 22. During powder compression, the powder exerts an equal and opposite effect on the punches 12, 14 and the rollers 44, 46 causing an outward displacement of the punches. By adjusting the pneumatic pressure of the compensators 48, 50, the total force exerted on the rollers 44, 46 and punches 14, 16 is varied and thus, the punch displacement can be changed. A greater pneumatic pressure exerted on the rollers 46, 48 and punches 14, 16 creates less outward displacement of the punches and rollers and, as a result, the pellets are compressed a greater amount thus increasing the density of the pellets. If the pneumatic pressure is lessened, the punch heads advancing into the roller periphery move the rollers outward and little punching force is applied.

A displacement transducer 54 is mounted on each roller 44, 46 for monitoring the displacement of the punches. The transducers 54 emit voltage signals indicative of the displacement of the punches 14, 16 and rollers 44, 46. In a prior art rotary press, at the point of maximum powder compression where the rollers contact the center of the top portion of the punches, a controller 64 senses and records each transducer voltage output. The controller 64 then compares the voltage output with a reference data voltage set at electrical zero. The reference data voltage corresponds to a theoretical punch position where no punching force has been applied, i.e., the theoretical position of the punches as they advance along the flat cam surfaces to the punching position. The difference between the two voltages represents theoretically the actual punch displacement. Based upon the comparisons of the two voltages, i.e. the theoretical "zero" voltage corresponding to the undisplaced punch position and the displaced punch position at compression, the pneumatic pressure is adjusted to obtain equal displacement of the punches for preventing undesirable pellet defect formation.

In practice, the theoretical "zero" position of the transducers 54 shifts and does not remain stationary. Machine vibration, variations in temperature, inaccurate mechanical tolerances, and other factors cause the transducers 54 to move slightly. The voltage output from the transducers 54 in a "true" non-punching position where the punches are positioned in the extended, forward positions just prior to the application of the punching force will sometimes be above or below the "zero" theoretical voltage. As a result, the transducers voltage output at the point of maximum compaction is rarely compared to the "true" zero position corresponding to advancement of the punches along the flat cam surface 42. The actual punch displacement at the punching position 26 is not measured accurately, and as a result, the finished pellets can vary in length from each other and not have a desirable configuration.

Figure 4:
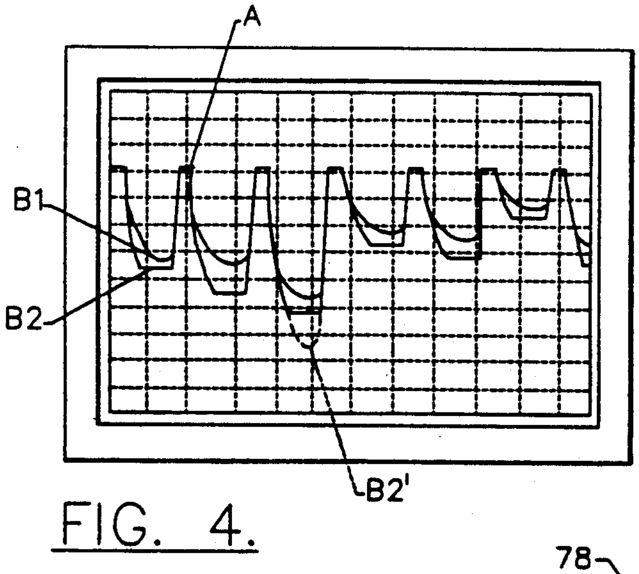
FIG. 4 is a view of an oscilloscope graph illustrating the output voltages of the transducers.

In accordance with the present invention, the displacement of upper and lower punches 14, 16 at the punching position 26 is compared with the reference punch displacement indicative of the actual, undisplaced position of the punches 14, 16 just prior to application of the punching force in the punching position. In the preferred embodiment, the actual displacement of the punches a they advance along the flat cam surface 42 is measured. The transducer output voltage at that point becomes a base reference "zero". This occurs for successive sets of both upper and lower punches. The base reference is shown in FIG. 4 as line (A) on the oscilloscope graph 56.

When the punches enter the punching position 26, the transducer voltage output is measured again for both upper and lower punches 14, 16. The transducers 54 emit a voltage indicative of the actual displacement at the punching position for the upper punch 14. This line is indicated B1 and for the lower punch 16 this line is indicated B2. As successive sets of upper and lower punches 14, 16 advance into the punching position, a new reference displacement voltage is emitted and established on the baseline (A) for the oscilloscope graph illustrated in FIG. 4. Thus, the actual punch displacement at the punching position 26 is compared with the actual displacement occurring just prior to the punches advancing into the punching position, thus, an actual displacement value is obtained.

In accordance with one embodiment of the present invention, a first set of upper and lower sensors 60 are positioned for sensing the undisplaced position of the punches 14, 16, when the punches are in the extended, inward position, i.e., advancing along the flat cam surface 42, and prior to advancing into the punching position 26 (FIG. 2). The first sensors are positioned on respective upper and lower sensor support members 62 fixed to respective upper and lower portions of the frame hub. FIG. 1 illustrates the upper support member 62. As upper and lower punches advance to a point lateral from the first sensors (FIG. 3), a signal is generated to a controller 64 which reads the voltage emitted from the transducers. This voltage becomes the reference line (A) on the oscilloscope as noted before. The controller 64 can be a microprocessor, microcomputer or other control means used conventionally in the industry.

Figure 3:
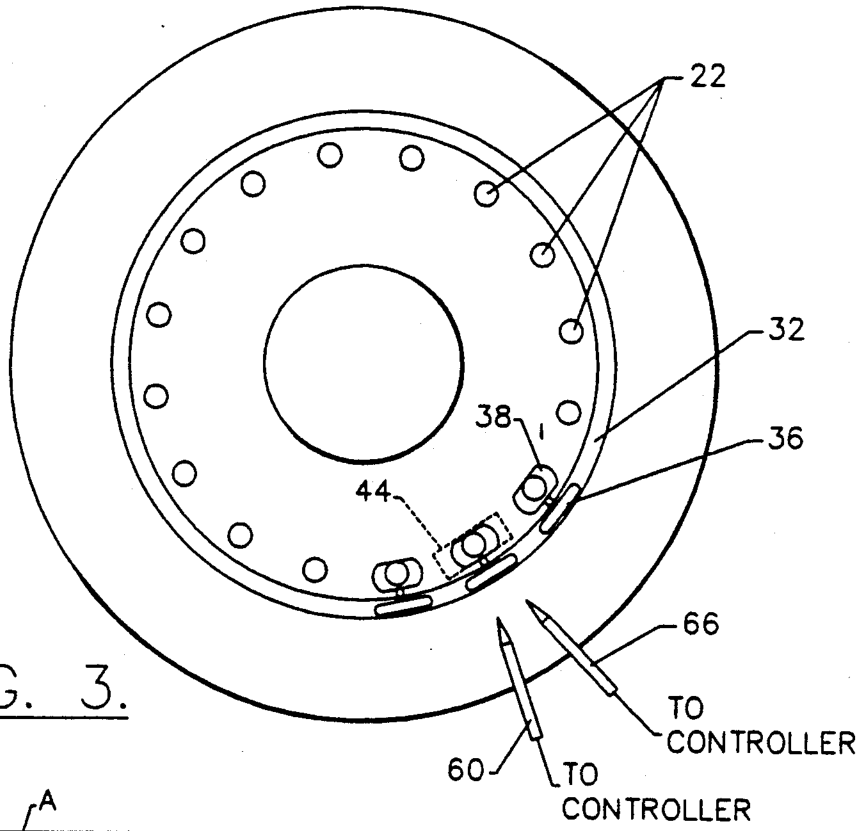
FIG. 3 is a schematic plan view showing the positional relationship of the die openings, punches and sensors.

A second set of upper and lower sensors 66 are mounted on each sensor support member 62 adjacent the punching position 26 (FIGS. 1 and 3). When the punches 14, 16 advance into the punching position, the sensors indicate the position of the punches to the controller 64 which stores the voltage value for comparison with the first emitted voltage corresponding to the position of the punches 14, 16 adjacent to the first set of sensors 60 and registers the emitted voltage on the oscilloscope. As shown in FIG. 4, B1 and B2 represent respective voltages emitted by the transducers 54 indicative of voltage output from the transducers and displacement of upper and lower punches 14, 16.

The controller 64 compares the emitted voltages indicative of punch displacement at the flat cam surface 42 with the emitted voltages indicative of punch displacement at the punching position 26. Based upon this comparison, the pneumatic pressure of the compensators 48, 50 is adjusted for obtaining a substantially equal displacement of both upper and lower punches. As illustrated in FIG. 4, the emitted transducer output voltages between upper and lower punches at the punching position may vary somewhat as seen in the oscilloscope graph. When there is little discrepancy between displacement, however, little or no pressure adjustment has to be made unless the length or density of the final pellet should be changed. When the change in transducer output voltage creates a large discrepancy, as shown in the dotted line B2, then typically the pneumatic pressure should be adjusted for ensuring equal displacement of top and bottom punches. However, adjustment does not occur sporadically with only one individual pellet deviation. The controller 64 includes conventional statistical process control for examining a statistical, repetitive pattern of pellets.

Figure 5:
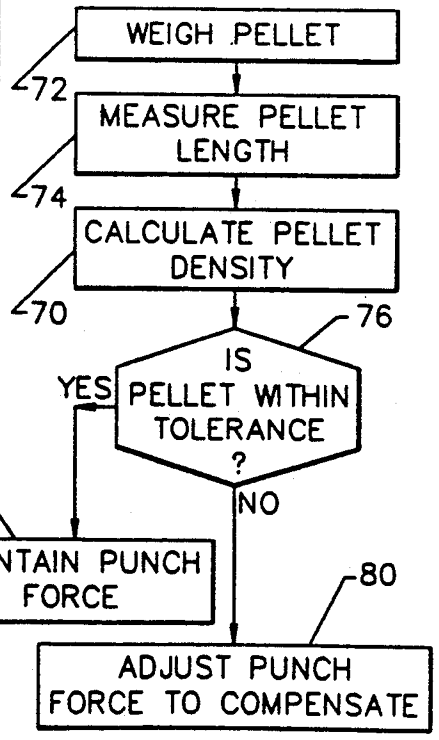
FIG. 5 is a flow chart showing a method for maintaining pellet density in accordance with the present invention.

Additionally, pellet density can be controlled more adequately by means of the present invention. FIG. 5 illustrates the basic block diagram steps for maintaining uniform pellet density and length. As illustrated, a sample pellet density is calculated at block 70. Density can be calculated and measured by many different means. One particular advantageous method is to weigh the pellet at block 72 and measure the pellet length at block 74. Because displacement of upper and lower punches is monitored and pneumatic compensator pressure adjusted as required, the diameter of the pellet will be substantially equal along its length. Thus, the diameter of a pellet can be considered a known, constant dimension and the density can be calculated based upon the measured length and weight of the pellet. If the pellet density is within a predetermined standard, block 76, corresponding to a range of pellet density values, the punch force is maintained at block 78. Again, as before, the controller 64 includes conventional statistical process control for examining a statistical, repetitive pattern of pellets. Adjustment will not occur sporadically with only one pellet deviation. If the calculated density is not within a range of values, the punch force is adjusted to compensate for the undesired density. Additionally, the powder amount inserted into the die openings 22 can be varied for changing the pellet length as desired.

When compression is completed and a pellet formed, as is conventional with most rotary presses, the formed pellet is ejected from the die opening. The formed pellets then are removed from the table and select sample weighed and its length measured as described before.

In the drawings and specification, there have been disclosed typical preferred embodiments in the invention and, although specific terms are employed, they are used in a generic and descriptive sense only, and not for purposes of limitation. Numerous variations can be made within the spirit and scope of the invention as described in the forgoing specification and defined in the following claims.

We claim:

1. A press machine comprising a plurality of press units, each press unit having a die opening and cooperating upper and lower punches being slidable into an extended, inward position in the die opening, means for advancing each press unit successively into a punching position where the upper and lower punches are positioned in the extended, inward position in the die opening for pressing material into a compact body, force generating means positioned at said punching position for exerting a punching force onto upper and lower punches advanced into the punching position, means for comparing the displacement of upper and lower punches when the punching force is applied with a reference displacement indicative of the actual undisplaced position of said punches just prior to the application of the punching force, and control means operatively connected to said force generating means and said comparing means for adjusting the punching force applied onto said punches in response to the compared displacements and predetermined values therefor.

2. A press machine according to claim 1 wherein said control means includes means for adjusting the punching force applied onto said punches so as to obtain substantially equal displacement of upper and lower punches or a predetermined density of the pressed material.

3. A press machine according to claim 1 including first sensor means being positioned for sensing the undisplaced position of said punches before advancing into said punching position, and second sensor means positioned adjacent said punching position for sensing the position of said punches when advanced into said punching position, and means connected to said comparing means and to first and second sensor means for measuring displacement of said punches in said sensed positions.

4. A press machine according to claim 1 wherein said force generating means for exerting a punching force onto said upper and lower punches advanced into said punching position includes spaced-apart upper and lower rollers positioned at said punching position for engaging respective upper and lower punches advanced into the punching position, and a pneumatic compensator connected to each roll for directing an inward, punching force onto respective rolls and punches.

5. A press machine according to claim 1 including upper and lower transducers operatively connected to said comparing means, and means operatively connecting upper and lower transducers to respective upper and lower punches when advanced into said punching position, said transducers being responsive to displacement of said punches and emitting signals representative of the punch displacement to said comparing means.

6. A press machine comprising a plurality of press units, each press unit having a die opening and cooperating upper and lower punches being slidable into an extended, inward position in the die opening, means for advancing each press unit successively into a punching position where the upper and lower punches are positioned in the extended, inward position in the die opening for pressing material into a compact body, guide cam means acting on said upper and lower punches for directing successive upper and lower punches into the die opening, said guide cam means including upper and lower inclined cam surfaces positioned adjacent the punching position for guiding respective upper and lower punches into the extended, inward position within the die opening, and a substantially flat cam surface extending from each of said inclined cam surfaces to the punching position for engaging and maintaining said punches in an extended, inward position as said punches approach said punching position, force generating means at said punching position for exerting a punching force onto upper and lower punches advanced into said punching position, means for comparing the displacement of said upper and lower punches when said punching force is applied with the undisplaced position of said punches advanced along said flat cam surfaces, and control means operatively connected to said force generating means and said comparing means for adjusting the punching force applied onto said punches in response to the compared displacements and predetermined values therefor.

7. A press machine according to claim 6 including a first sensor means positioned adjacent said flat cam surface for sensing the undisplaced position of said punches before advancing into said punching position, and second sensor means positioned adjacent said punching position for sensing the position of said punches when advanced into said punching position, and means operatively connected to said comparing means and said first and second sensor means and responsive to first and second sensor means for measuring displacement of said punches in said sensed positions.

8. A rotary press machine according to claim 6 wherein said control means includes means for adjusting the punching force applied onto said punches and for obtaining substantially equal displacement of upper and lower punches or a predetermined density of the pressed material.

9. A press machine according to claim 6 including upper and lower transducers operatively connected to said comparing upper and lower transducers to said respective upper and lower punches when advanced into said punching position, and wherein said transducers are responsive to displacement of said punches for emitting signals representative of said displacement to said comparing means.

10. A press machine according to claim 6 wherein said means for exerting a punching force onto said upper and lower punches advanced into said punching position includes spaced-apart upper and lower rollers positioned at said punching position for engaging upper and lower punches advanced into the punching position, and a pneumatic compensator connected to each roll for directing an inward punching force onto respective rolls and punches.

11. A press machine comprising a plurality of press units, each press unit having a die opening and cooperating upper and lower punches being slidable into an extended, inward position in the die opening, means for advancing each press unit successively into a punching position where the upper and lower punches are positioned in the extended, inward position in the die opening for pressing material into a compact body, guide cam means acting on said upper and lower punches for directing successive sets of upper and lower punches into the die opening, said guide cam means including upper and lower inclined cam surfaces positioned adjacent the punching position for guiding respective upper and lower punches into the extended, inward position, a substantially flat cam surface extending from each of said inclined cam surfaces to the punching position for engaging and maintaining said punches in an extended, inward position as said punches approach said punching position, spaced-apart upper and lower rollers positioned at the punching position for engaging respective upper and lower punches advanced into the punching position, force generating means connected to each roll for exerting a punching force onto upper and lower punches advanced into the punching position, a transducer connected to each roll for emitting signals indicative of the displacement of the rolls and punches when a punching force is applied, first sensor means positioned adjacent said flat cam surface for generating a signal indicative of the advancement of punches thereon, second sensor means positioned at said punching position for generating a signal indicative of the advancement of punches into said punching position, and means connected to said sensor means and transducers for receiving signals from said sensor means and for receiving said transducer signals indicative of the displacement of the roll and punch, means for comparing the received transducer signals indicative of the displacement of upper and lower punches at said punching position, and control means operatively connected to said force generating means and said comparing means for adjusting the punching force applied onto said punches in response to the compared displacements and predetermined values therefor.

12. A press machine according to claim 11 wherein said control means includes means for adjusting the punching force applied onto said punches so as to obtain substantially equal displacement of upper and lower punches or a predetermined density of the pressed material.

* * * * *